United States Patent
Gfeller et al.

(10) Patent No.: US 6,812,959 B1
(45) Date of Patent: Nov. 2, 2004

(54) CAMERA WITH OPTOELECTRIC TRANSDUCER ARRANGEMENT ROTATABLE ABOUT AXIS PERPENDICULAR TO IMAGE PLANE

(75) Inventors: Karl Gfeller, Langwiesen (CH); Ulf Muehl, Büsingen (DE)

(73) Assignee: Sinar AG, Feuerthalen (CH)

( * ) Notice: Subject to any disclaimer, the term of this patent is extended or adjusted under 35 U.S.C. 154(b) by 0 days.

(21) Appl. No.: 09/527,460

(22) Filed: Mar. 17, 2000

(51) Int. Cl.[7] .............................................. H04N 5/225
(52) U.S. Cl. ................................................... 348/219.1
(58) Field of Search ................................. 348/345, 348, 348/219.1

(56) References Cited

U.S. PATENT DOCUMENTS

| | | | |
|---|---|---|---|
| 5,400,070 A | * 3/1995 | Johnson et al. | 348/219.1 |
| 5,453,784 A | * 9/1995 | Krishman et al. | 348/348 |
| 6,072,529 A | * 6/2000 | Mutze | 348/348 |
| 6,141,051 A | * 10/2000 | Koch et al. | 348/345 |
| 6,307,591 B1 | * 10/2001 | Yoshida et al. | 348/445 |

FOREIGN PATENT DOCUMENTS

JP          04096585 A   * 3/1992
JP          10065975 A   * 3/1998

OTHER PUBLICATIONS

Patent Abstracts of Japan, vol. 016, No. 326 (E–1235) Jul. 16, 1992, entitled "Picture Input Device" of Yujiro Ishikawa, derived from JP 04 096585 A, published Mar. 27, 1992.
Patent Abstracts of Japan, vol. 1998, No. 08, Jun. 30, 1998, entitled "CCD Television Camera" of Atsushi Kato, derived from JP 10 065975 A, published Mar. 6, 1998.

* cited by examiner

Primary Examiner—Wendy R. Garber
Assistant Examiner—Rashawn N. Tillery
(74) Attorney, Agent, or Firm—Dykema Gossett PLLC

(57) ABSTRACT

An optoelectric transducer arrangement (7b) is moved by being driven and by being controlled by means of cam/curve guides to convert the whole image to be imaged in a still camera despite that said transducer has a sensor surface that is smaller than the image area to be imaged in the image plane (B). The cam/curve arrangement includes four cam disks (15), for example, whereby one cam disk (15a) is driven by a motor. The transducer (7b) rides on a transducer carrier plate (21), which is moved by means of cams (19) on the cam disks (15, 15a). The transducer movement occurs thereby in a translatory manner.

5 Claims, 4 Drawing Sheets

CAMERA WITH OPTOELECTRIC TRANSDUCER ARRANGEMENT ROTATABLE ABOUT AXIS PERPENDICULAR TO IMAGE PLANE

BACKGROUND OF THE INVENTION

Field of the Invention

The present invention relates to a still camera that has an optoelectric transducer arrangement with a sensor surface in the image plane whereby the sensor surface is smaller than the area to be imaged in the plane, and whereby the transducer arrangement is mounted parallel to the image plane and controlled, driven, and slidable therein.

The present invention relates to a still camera that has an optoelectric transducer arrangement with a sensor surface in the image plane whereby said sensor surface is smaller than the area to be imaged in said plane, and whereby the transducer arrangement is mounted parallel to the image plane being controlled, driven, and slidable therein.

Optoelectric transducer arrangements, such as CCD arrays, are relatively expensive components in digital cameras. This is especially the case when they are designed by having a relatively large surface. In digital cameras with a relative large area to be imaged in the image plane, it is known therefore to provide optoelectric transducer arrangements whereby their sensor surface is smaller than the area to be imaged in the image plane. The transducer arrangement is driven by means of mechanical stage guides (stage with X and Y movements) and moved time-sequential over individual segments of the area to be imaged in the image plane. The optoelectrically converted image segment is stored at each position of the transducer arrangement. These image segments are subsequently combined again electronically into a complete image.

The process of precise mechanical stage guiding for exact mechanical shifting and positioning of the optoelectric transducer arrangement with coordinate drives that may be driven independently is constructively extremely complicated.

It is the object of the present invention to provide a still camera of the type mentioned in the beginning with which the transducer arrangement may be positioned over the image segments substantially simpler and more cost-effective without loss of precision in positioning.

SUMMARY OF THE INVENTION

In view of the first object aspect according to the invention, the object is achieved in that the optoelectric transducer arrangement is rotatably mounted about an axis that is perpendicular to the plane of the image.

Through this process it is achieved that the transducer arrangement, which is now rotatably mounted in the most simple way, may be rotated sequentially by means of one single drive over various segments of the area to be imaged in the image plane.

With this process there has to be basically considered that because of the pivoting movement of the transducer arrangement, the image segments appear sequentially pivoted on the sensor surface of the transducer arrangement and they are correspondingly converted optoelectrically as they are positioned. With this innovative process it is therefore proposed that the electric output of the transducer unit is actively connected with an electric signal that represents the converted image area, as well as with a signal that identifies the rotational position of the transducer arrangement, and with inputs of a computing element, which converts the signal representing the image area in accordance with the signal identifying the rotational position, into a signal representing the predetermined two-dimensional alignment of the aforementioned image area—in relation to the camera.

Thereby, the computing element does not change the electrically supplied image area information, but turns back by computing—essentially based on a coordinate transformation—the electrically supplied image information in a predetermined two-dimensional alignment in such a manner that each electric image area signal represents one image area in the same alignment, independent from the mechanical rotational angle.

Even though it is absolutely possible to rotatably mount the transducer arrangement relative to an axis of rotation that lies outside the area to be imaged in the image plane, it is preferably proposed that the optoelectric transducer arrangement be rotatably mounted relative to the optical axis. Thereby there is in one instance the possibility to scan the area to be imaged sequential in segments with an optimal small sensor surface of the transducer arrangement and thereby the mentioned electronic rotation compensation becomes very simple on said computing element.

In a second and currently preferred solution approach, according to the invention, the optoelectric transducer arrangement is guided by means of a cam/curve arrangement parallel to the image plane and with consideration to its shifting characteristics. Thereby it is made basically possible to guide the optoelectric transducer arrangement in an arbitrary movement path sequentially over the area to be imaged in the image plane, to scan said area to be imaged, and to realize this furthermore with one single controlled drive.

In a highly preferred embodiment of the innovative still camera, taking the secondly mentioned aspect into consideration, the optoelectric transducer arrangement is guided exclusively translatory relative to its shifting characteristics by means of the cam/curve arrangement. This has the considerable advantage that—based on the purely translatory shifting of the optoelectric transducer arrangement—no relative rotation of the image occurs on the sensor surface of the transducer arrangement and thereby no computed rotation or pivoting compensation is to be expected. In relationship to the thereby performed movement of the optoelectric transducer arrangement, the advantage of a mechanical stage movement guide is maintained.

In another preferred embodiment of the innovative still camera, referring to the second (solution) approach, the optoelectric transducer arrangement is guided by means of an annular cam/curve arrangement of the same effective radii.

If there are only two of the cam/curve arrangements provided—and the optoelectric transducer arrangement is guided along a straight line via cams—then it is of course guaranteed that the two cam/curve arrangements are imperatively and simultaneously driven in the same rotational direction. This may be prevented, for example, by movement coupling or by preventing that the cam/curve arrangement is driven to its dead end.

In a preferred embodiment of the innovative still camera under all aspects, the sensor surface of the optoelectric transducer arrangement has at least one approximate rectangular or square surface.

On the innovative still camera, under all its aspects, there is furthermore preferably provided one single, guided rotating drive, which is actively connected to the optoelectric transducer arrangement and stationary relative to the camera.

The invention as described below with reference to drawings.

DETAILED DESCRIPTION OF THE PREFERRED EMBODIMENTS

Figure 1:
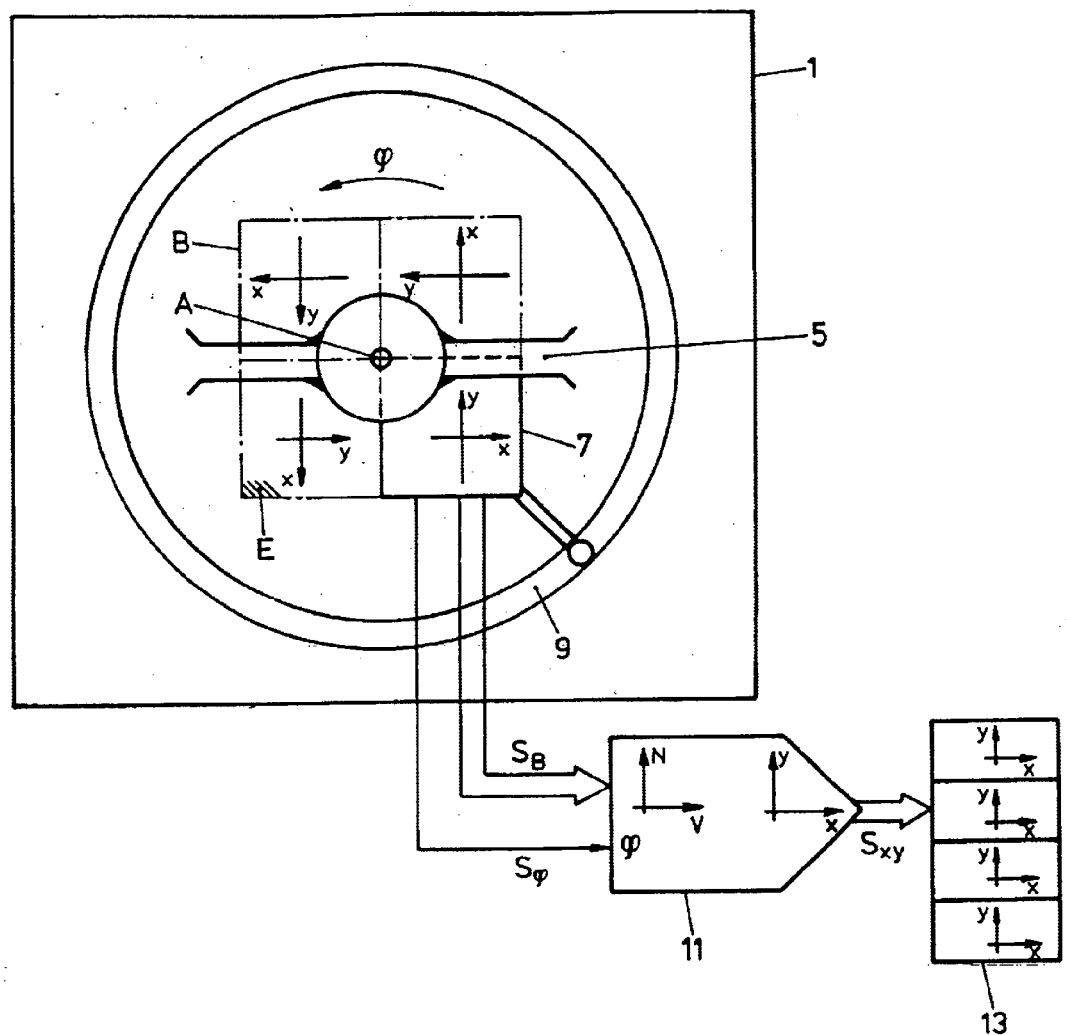
FIG. 1 shows schematically a rear view of the image plane of a still camera, according to the invention and under the first innovative approach, with a first embodiment of the guide and the drive of the optoelectric arrangement.

In FIG. 1 there is illustrated schematically and simplified a top view of the mounting plate 1 of an innovative still camera, wherein a guide and a drive for an optoelectric transducer arrangement is provided. The view is in the direction toward the camera lens. The letter A identifies the optical axis of the camera pointed toward the plane of the image E.

On the mounting plate 1 of the camera, a rotating drive 3 is mounted in a fixed manner on carriers 5, for example, and centered relative to the optical axis A, as illustrated. On the drive axle (not shown) of the rotating drive 3 there is mounted in one corner area, for instance, at least one square optoelectric transducer arrangement 7 according to FIG. 1, e.g. in the form of a CCD array. If necessary, and as shown in FIG. 1, the one corner of the transducer arrangement 7, which is on the opposite side of the corner and at the rotating axis of the rotating drive 3, is mounted slidably or on rollers in a guide channel 9 that runs coaxial around the optical axis A.

The single transducer arrangement 7, illustrated in FIG. 1 in a stretched-out manner, is rotated by sequential rotations, for example, in the direction Φ by 90°, respectively, in the four positions shown by dotted lines. In each of said positions, the corresponding segment of the image area B that is to be imaged is optoelectrically converted and stored.

According to FIG. 1, the spatial orientation is entered on a proposed transducer with the aid of a X/Y coordinate system. As it can be clearly seen, with each 90° rotation of the transducer 7, its absolute orientation is rotated by 90° relative to the area B. Thereby each of the four segments is flipped with each additional 90° rotation. Should now every converted image segment be stored as is and should the stored segments be combined again afterwards to obtain the complete image, then each of the four segments appear flipped by 90°, respectively.

As further illustrated in FIG. 1, because of the above fact there is a signal S Φ identifying the respective rotational position Φ of the rotating drive 3, which is transmitted to the computing element 11 subsequently or, as illustrated, before the storage of the output signals $S_B$ of the optoelectric transducer 7 corresponding to the electronically converted segments. Thereby the respective V/W position of the segment is changed to the desired and predetermined X/Y alignment—under consideration of the respective pivoting angle Φ. Afterwards, all spatial and equally aligned electronic segments or areas are stored in the computing element 13, as schematically illustrated, and said segments may be subsequently combined again into a complete image corresponding to the image area B that is to be imaged in the camera.

Rectangular or otherwise-shaped transducer arrangements may also be inserted in place of the square transducer arrangement, as illustrated in FIG. 1 and as preferred in this embodiment.

The transducer arrangement 7 is preferably mounted relative to the rotational axis of the rotating drive 3 in such a manner that a overlapping region of the image area B may be repeatedly converted by the transducer arrangement 7 depending on the respective subsequent pivoting positions. The image segments may thereby be optimally combined again by means of a so-called mosaic(ing) or stitching software. The size of the overlapping region is determined by the tolerance of the mechanics of the camera and/or by small movements of the camera during sequential exposure taking, which may never be completely ruled out.

Additionally, the transducer arrangement 7 according to the embodiment in FIG. 1 may of course include two transducer arrangements of the kind depicted in FIG. 1 so that the entire image area B is scanned with two 90° pivoting movements.

Figure 2:
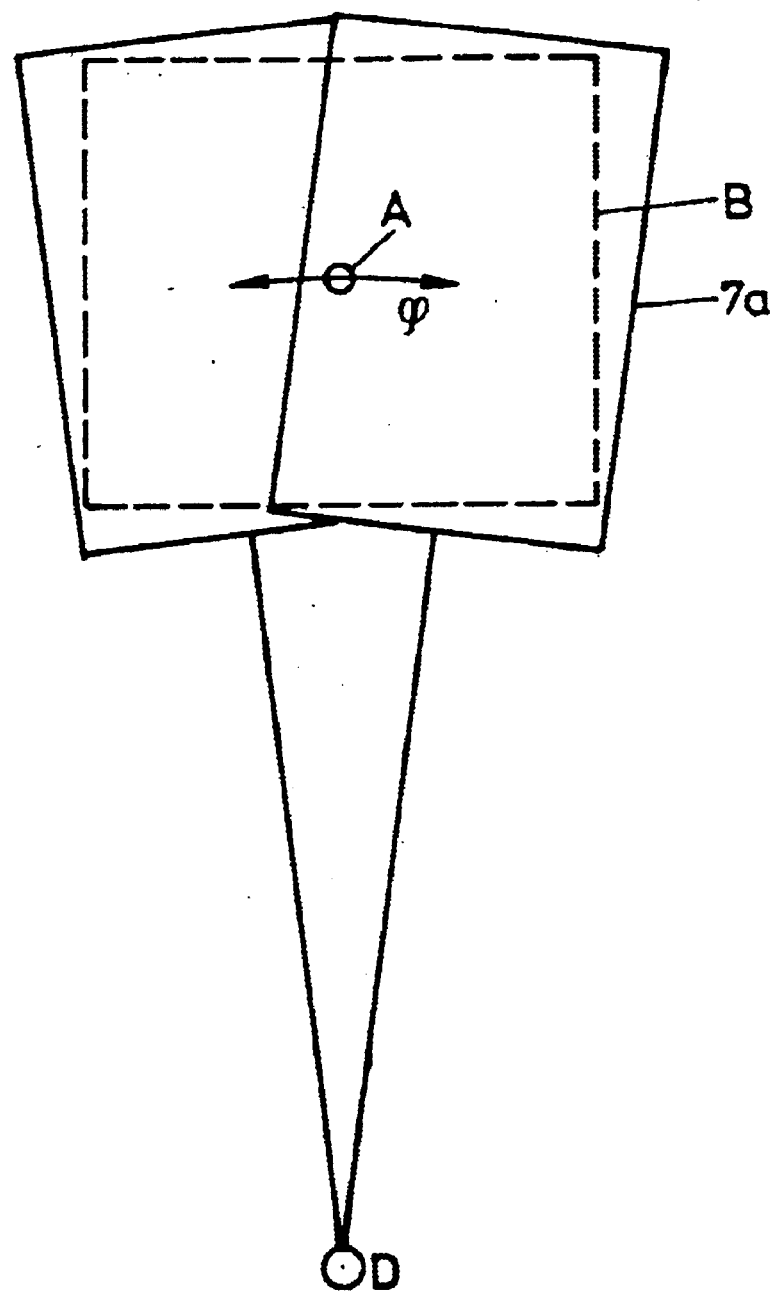
FIG. 2 shows also schematically a view, corresponding to the one in FIG. 1, of a second embodiment under the first aspects according to the invention.

In contrast, there is in FIG. 2 an embodiment of the innovative still camera illustrated, still schematically, which is currently less preferred and which furthermore follows the first aspect. Therein the transducer arrangement 7a is no longer mounted controlled, driven or slidable, and is no longer coaxial to the optical axis A, but the drive (not illustrated) is correspondingly offset relative to an eccentric pivoting axis D. The proposed transducer arrangement 7a is sequentially pivoted in a narrow angle Φ similar to a "trowel" movement. With these sequential pivoting positions of the transducer arrangement 7a, the entire image areas B of the camera in the image plane is again scanned as indicated by dotted lines in FIG. 2. In analogy to FIG. 1, the pivoting movements of the respective segments relative to the transducer 7a are compensated via a computing element corresponding to the respective pivoting positions which is designed as shown in FIG. 1.

Figure 3:
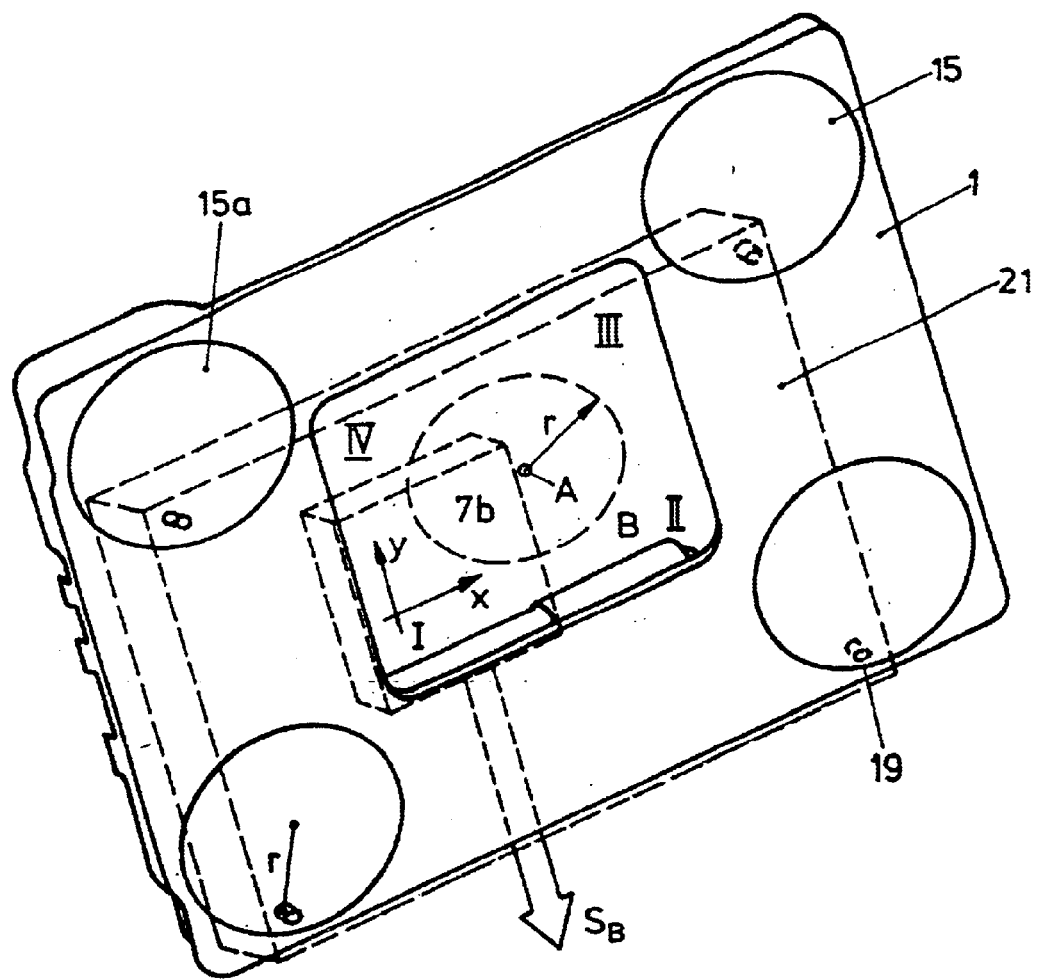
FIG. 3 shows in a perspective view and in a schematic illustration a preferred embodiment of a drive and the guide of the optoelectric transducer arrangement on a still camera, according to the invention, under the second innovative and currently preferred aspect.
Figure 4:
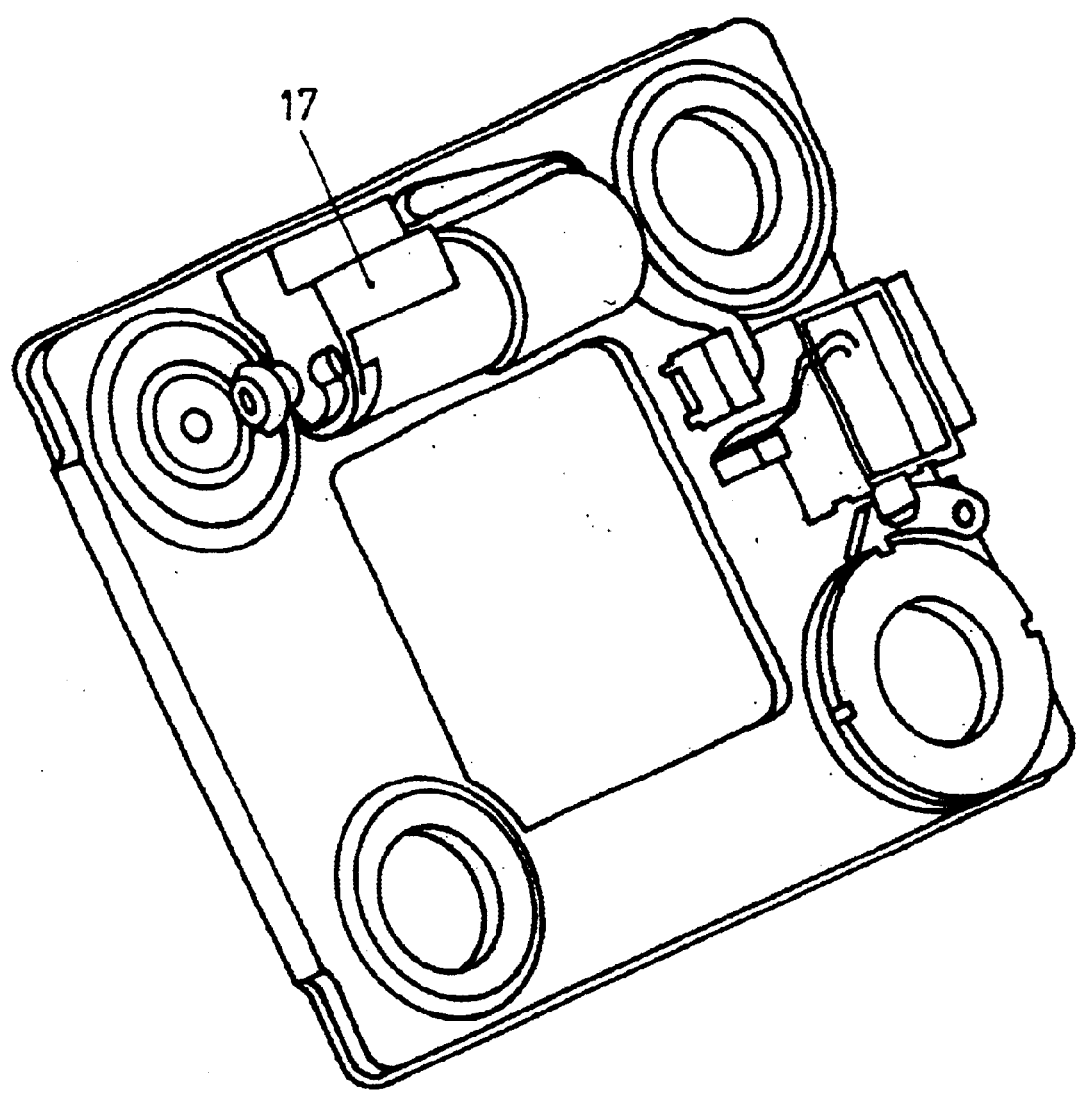
FIG. 4 shows a perspective rear view of the arrangement according to FIG. 3.

In FIG. 3 there is illustrated in a perspective view and again schematically, the mounting plate 1 on the innovative still camera, according to the second aspect, which is currently preferred. Four annular cam disks 15 are mounted on the mounting plate 1. One of the disks, for example 15a, is driven from the rear by a controlled drive motor 17, as shown in FIG. 4. The remaining three cam disks 15 are free-wheeling disks. Each of the disks 15a, 15 carries a protruding dog cam 19. The cams 19 engage the corresponding guide borings in a transducer carrier plate 21 whereby said borings are disposed in the corner section of said carrier plate. The transducer carrier plate 21 is shown by dotted lines in FIG. 3 for better viewing. Based on the rotating drive movement by means of the drive cam-disk 15a, the transducer arrangement 7b is turned together with the transducer carrier plate 21 in a circular path with a cam radius r (eccentric) around the optical axis A of the camera in the image area B of the image plane; however, it is exclusively based on a translatory movement. Thereby an advantage is created in that the spatial X/Y alignment of the transducer arrangement 7b, and thereby also its sensor surface, remain stationary in spite of its turning around axis A.

In place of a square transducer arrangement 7b it could be indicated in this embodiment to insert a rectangular transducer arrangement in a position aligned perpendicular or cross-wise. Additionally, the proposed transducer arrangement may have more than one arrangement relative to 7b in FIG. 3, e.g. two juxtaposed, or two lying on top of one another, or two being disposed diagonally to one another. The transducer arrangement 7b is designed also here, relative to its rotating movement around axis A, in such a manner that it takes up in a double measure or converts subsequent positions relative to the overlapping areas of the image area B in the four positions that correspond to quadrants I through IV, as it was already explained in conjunction with FIG. 1 and FIG. 2.

In addition, the movement guide of the transducer carrier plate 21 may be realized in the embodiment in FIG. 3 and FIG. 4 also with only two or three cam disks 15. In the embodiment in FIG. 3 and FIG. 4, a movement guide of the transducer arrangement 7b is realized in a preferred way by the use of a cam/curve guide. The curve is realized by the circular path, in particular of the driving cam disk, into which the cam engages along said circular path by being guided there inevitably and whereby said cam is generally actively connected to the transducer 7b. The cams 19 may be fixed of course on the transducer carrier plate 21 and they may be provided on the annular groove that encircles the mounting plate 1, or in the reverse in a mechanical sense, one or more or all cam disks may be provided on the transducer carrier plate 21, and the guide cams or the receivers for the guide cams may be provided on the mounting plate 21. Since the latter is stationary mounted on the camera 1, it is preferred to place the driven curve arrangement on said mounting plate.

Cam/guide curves with active connections deviating from the annular guide path may be inserted, if necessary.

With the still camera according to the invention, it is achieved that an optoelectric transducer arrangement converts successive image segments by controlled, driven shifting, whereby the sensor surface of said transducer arrangement is smaller than the image areas to be imaged in the image plane, whereby extremely simple movement guides are realized, and whereby only one single drive motor effects the transducer arrangement while being firmly attached to the camera.

What is claimed is:

1. A still camera comprising an optoelectric transducer arrangement including a sensor surface in an image plane, said sensor surface being smaller than an image area to be imaged in said plane, and a cam apparatus for slideably guiding said transducer arrangement to move with said sensor surface parallel to said image plane in a two dimensional exclusively translatory manner.

2. The camera of claim 1, wherein said cam apparatus comprises a cam guided to move along a predetermined path which has a shape of a circle segment or of a circle.

3. The camera of claim 2, wherein said cam apparatus comprises at least two cams moveable along respective circle segments or circle paths of equal radii.

4. The camera of claim 1, wherein said sensor surface is at least approximately rectangular or square and said transducer arrangement is slideably guided by said cam arrangement to move parallel to edges of said rectangular or square surface.

5. The camera of claim 1, wherein said cam apparatus comprises at least one cam drivingly moved along a circle segment or circle path, the movement of said cam generating said two-dimensional translatory movement of said transducer arrangement with said sensor surface relative to and along said image plane.

* * * * *